(12) United States Patent
Talbot et al.

(10) Patent No.: US 7,472,533 B2
(45) Date of Patent: Jan. 6, 2009

(54) CROP HEADER WITH DRAPER CANVAS AND A SEAL WITH AN ELEMENT OF THE CUTTER BAR

(75) Inventors: Francois R. Talbot, Winnipeg (CA);
Bruce Robert Shearer, Winnipeg (CA);
Daniel G. Cormier, Oak Bluff (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 35 days.

(21) Appl. No.: 11/552,039

(22) Filed: Oct. 23, 2006

(65) Prior Publication Data

US 2008/0092508 A1    Apr. 24, 2008

(51) Int. Cl.
*A01D 43/00* (2006.01)
(52) U.S. Cl. .................................................... 56/181
(58) Field of Classification Search ............... 56/181, 56/162, 14.5, 158, 174, 175, 177; 474/237, 474/242; 198/699, 841, 523
See application file for complete search history.

(56) References Cited

U.S. PATENT DOCUMENTS

| | | | | |
|---|---|---|---|---|
| 1,862,101 A | * | 6/1932 | Pax | 198/523 |
| 2,347,365 A | * | 4/1944 | Paradise | 198/699 |
| 4,484,903 A | * | 11/1984 | Schneider | 474/242 |
| 5,459,986 A | | 10/1995 | Talbot et al. | |
| 6,351,931 B1 | | 3/2002 | Shearer | |

* cited by examiner

Primary Examiner—Árpád Fábián-Kovács
(74) Attorney, Agent, or Firm—Adrian D. Battison

(57) ABSTRACT

A crop harvesting header with a cutter bar and a draper assembly has a draper canvas with a plurality of transverse slats with a resilient strip across a front edge of the outer surface in front of the front end of the slats to cooperate with a rearwardly projecting element of the cutter bar extending over the upper run of the draper canvas to engage the upper surface of said strip to form a seal to inhibit entry between the cutter bar and the draper canvas of materials carried by the cut crop. There is also provided a bead on the canvas on the surface opposite the strip within the width of the strip. The arrangement can be symmetrical with a strip at each of the front and rear edges spanned by the slats extending between them, with beads on each edge opposite the front and rear strips respectively.

25 Claims, 4 Drawing Sheets

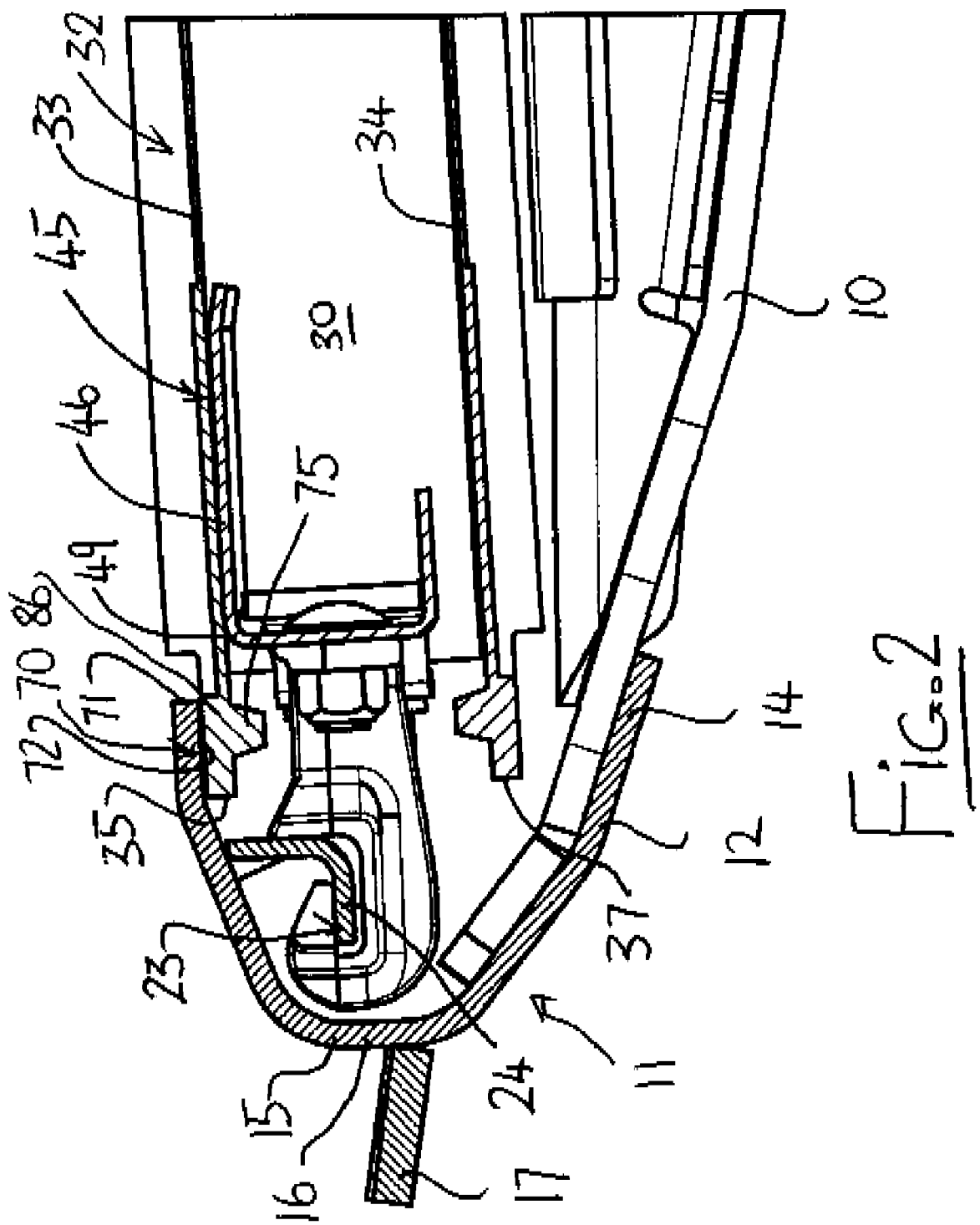

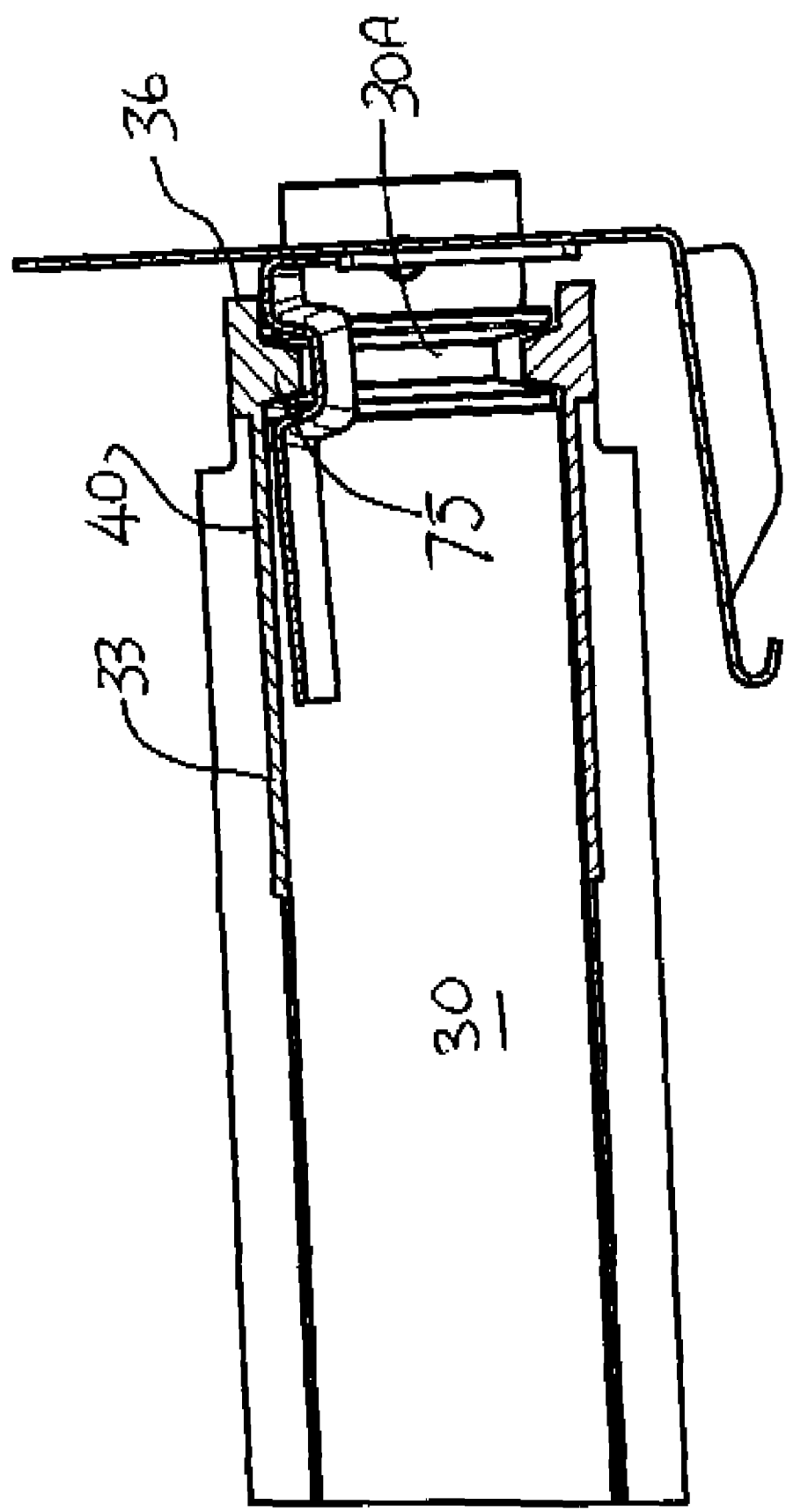

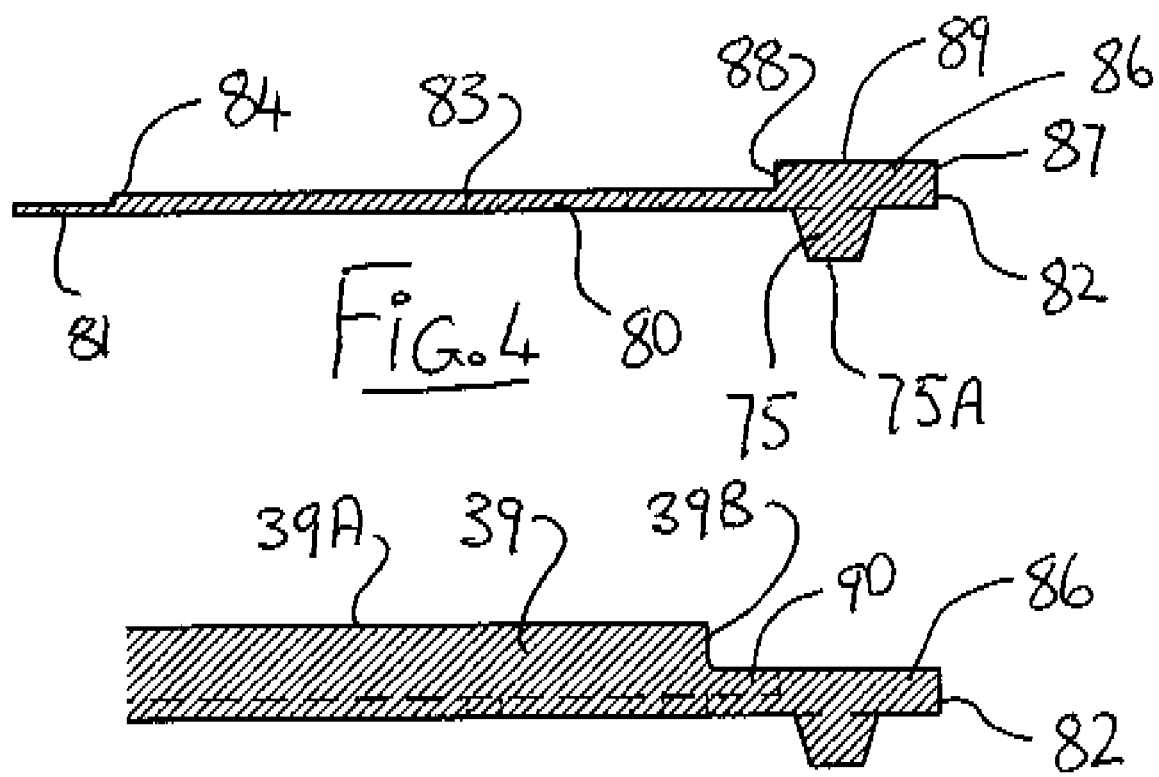

CROP HEADER WITH DRAPER CANVAS AND A SEAL WITH AN ELEMENT OF THE CUTTER BAR

This invention relates to a header for cutting and transporting a standing crop with a transverse leading cutter bar and particularly to an arrangement which provides a seal between a front edge of a draper canvas and an element of the cutter bar and to a draper canvas designed for use with the header.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper canvas forming a continuous loop of flexible material wrapped around the rollers so as to define a front edge of the canvas adjacent the cutter bar, a rear edge of the canvas spaced rearwardly of the cutter bar, an upper run of the canvas on top of the roller and a lower run of the canvas below the rollers. The cut crop thus falls rearwardly onto the upper run of the canvas and is transported longitudinally of the header. Generally, between the draper rollers there is provided a support plate assembly for the upper run of the draper canvas to prevent sagging.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper canvas normally comprises a fabric which is coated with a rubber material which is then vulcanized after forming of the fabric into the required shape and after attachment thereto of transverse slats.

The arrangement shown in U.S Pat. No. 5,459,986 (Talbot) issued Oct. 24 1995 and assigned to the present Assignees of the above patent has achieved significant success and has been used for many years. It provides a seal between an under surface of a rearwardly extending element of the cutter bar and a front edge portion of the upper surface of the canvas.

Not shown in the above patent is the conventional guiding arrangement to prevent misalignment of the draper canvas on the rollers and this is provided by a bead located on the underside of the canvas which runs in a groove in the roller.

An alternative arrangement is shown in U.S. Pat. No. 6,351,931 (Shearer) issued Mar. $5^{th}$ 2002 also of the present Assignees. This provides an additional guide bead on the outer surface of the canvas which runs in contact with the edge of the element of the cutter bar. This arrangement has not been successful and has not been adopted since it failed to provide the expected improvements over the Talbot arrangement.

SUMMARY OF THE INVENTION

It is one object of the invention to provide a further design of header and particularly the draper canvas therefore which can assist in providing a seal between the canvas and the cutter bar.

According to one aspect of the invention there is provided a header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that cut crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

the draper assembly including a draper canvas forming a continuous loop of flexible material wrapped around the rollers so as to define an upper run of the draper canvas on top of the rollers and a lower run of the draper canvas below the rollers and so as to define an outer surface facing outwardly and an opposed inner surface;

a front edge of the upper run of the draper canvas being arranged underneath the cutter bar, and a rear edge of the upper run of the draper canvas being spaced rearwardly of the cutter bar;

a front draper support plate defining a substantially horizontal support surface lying under the upper run adjacent the front edge thereof and extending therealong between the first and second guide rollers;

the first and second guide rollers each having a front end thereof recessed rearwardly of the front edge of the upper run of the draper canvas and the support plate having a front edge thereof recessed rearwardly of the front edge of the upper run of the draper canvas such that the upper run of the draper canvas includes a portion thereof at the front edge which is cantilevered forwardly of the rollers and of the support plate;

the draper canvas including a base layer of a sheet material;

the draper canvas including an additional strip of a resilient material attached on to the base layer at or adjacent the front edge on the outer surface and extending rearwardly from the front edge of the draper canvas to a rear edge of the strip spaced rearwardly of the front edge;

the strip standing outwardly of the outer surface from the base layer to define an outer surface of the strip raised from the base layer;

the cutter bar including an element thereof extending rearwardly over the upper run of the draper canvas to a position rearwardly of the front edge of the upper run of the draper canvas and forwardly of the front end of the rollers and of the front edge of the support plate and engaging the upper surface of said strip on the draper canvas so that the engagement between the element of the cutter bar and the upper surface of the strip forms a seal to inhibit entry between the cutter bar and the draper canvas of materials carried by the cut crop.

It will be appreciated that the term "draper canvas" is a traditional term based upon the material from which the "canvas" was made but that this term no longer provides any indication of nor limitation to the use of particular materials for the base fabric from which the "canvas" is made. Many synthetic material can thus be used. Commonly the canvas is coated with a rubber layer and again many different resilient coating materials can be used and no limitation is intended herein in this regard.

While the knife used with the cutter bar is usually of the sickle knife type including a plurality of knife guards mounted on the cutter bar, other types of knife can also be used.

In some embodiments, the cutter bar itself comprises a channel shaped member which defines the trailing edge as an integral portion of the cutter bar itself. In other embodiments, the cutter bar forms in effect a single bar carrying the sickle knife with a separate canvas carrier element in the form of a plate attached to and carried by the cutter bar. In this latter arrangement, the trailing edge can be provided by the edge of the canvas carrier rather than the cutter bar itself. However it will be appreciated that in both arrangements the guide bead engages an edge which is fixed relative to the cutter bar and thus is guided in position relative to the cutter bar as it moves along the cutter bar.

Preferably the strip of resilient material at the front edge is of substantially constant thickness such that the upper surface is substantially flat so as to define a flat surface in contact with a corresponding flat surface of the element of the cutter bar. However other shapes may be provided including narrower raised portions.

Preferably the front edge of the strip of resilient material at the front edge is located at the front edge of the canvas. However it maybe recessed slightly rearwardly to leave a bare edge portion without interfering with the operation.

Preferably the rear edge of the strip of resilient material at the front edge is substantially coincident with the rear edge of the element. This is the intention in order that the sealing surface be coincident. However it will be appreciated that the rear edge of the strip can be slightly retarded from or slightly proud of the rear edge of the element without interfering with the operation.

Preferably the rear edge of the strip is in front of the front edge of the support plate. In this way the strip is cantilevered forwardly of the support plate and thus part of the canvas which is free to flex from pressure from the element of the cutter bar.

Preferably the strip of resilient material at the front edge is shaped such that the strip has a width from the front edge to its rear edge which is greater than its height from the outer surface of the canvas. This provides a seal of sufficient width to be effective without interfering with the flexibility of the canvas to traverse around the roller. Typically the strip has a width of the order of 25 mm and a height of the order of 4 mm.

As conventionally, the draper canvas is preferably formed of a layer of fabric material with a resilient coating on the layer of the fabric material.

Preferably the draper canvas has a folded edge at least at the front edge and more preferably the folded edge is folded back on the outer surface of the fabric material for enhanced stiffness.

Preferably the draper canvas includes a second strip on the rear edge located and arranged symmetrically relative to the strip on the front edge for reversibility of the canvas when worn.

In this arrangement, the draper canvas preferably has a bead of a resilient material attached on the inner surface adjacent the front edge and a second bead of a resilient material adjacent the rear edge located and arranged symmetrically relative to the bead adjacent the front edge.

Preferably each of the beads is arranged so as to lie on the inner surface opposite to the respective strip within the width of the respective strip. The front bead therefore has no effect since it is located underneath the strip forwardly of the roller and support plate but the rear bead is a guide bead for cooperating with a groove in the roller. The symmetrical arrangement again allows reversibility.

Preferably the draper canvas has a plurality of slats arranged transverse to a direction of movement of the draper canvas with the slats having a height from the draper canvas which is greater than the height of the strip from the draper canvas. Preferably each of the slats has a front end spaced rearwardly from the rear edge of the strip.

Preferably the strip and the slats are molded integrally so that there is provided a plurality of pieces of resilient material each connecting a forward end of a respective one of the slats to the strip with the pieces having a height from the draper canvas which is substantially equal to the height of the strip from the draper canvas.

Preferably to provide the above symmetrical arrangement, the draper canvas includes a second strip on the rear edge located and arranged symmetrically relative to the strip on the front edge with the second strip having a front edge at or adjacent the rear edge of the draper canvas and a rear edge spaced from the rear edge of the draper canvas and the draper canvas has a bead of a resilient material attached on the inner surface adjacent the front edge of the draper canvas and a second bead of a resilient material adjacent the rear edge of the draper canvas located and arranged symmetrically relative to the bead adjacent the front edge of the draper canvas, with the slats extending between the strip and the second strip.

According to a second aspect of the invention there is provided a draper canvas for use with a draper assembly of a header for cutting and transporting a standing crop where the draper assembly includes a first and a second draper guide roller and where the draper canvas is arranged for forming a continuous loop of flexible material wrapped around the rollers so as to define an upper run of the draper canvas on top of the rollers and a lower run of the draper canvas below the rollers and so as to define an outer surface facing outwardly and an opposed inner surface;

the draper canvas comprising:

a base layer of a sheet material;

an additional strip of a resilient material attached on to the base layer at or adjacent the front edge on the outer surface and extending rearwardly from the front edge of the draper canvas to a rear edge of the strip spaced rearwardly of the front edge;

the strip standing outwardly of the outer surface from the base layer to define an outer surface of the strip raised from the base layer;

the strip being shaped such that the strip has a width from the front edge to its rear edge which is greater than its height from the outer surface of the canvas;

and a plurality of slats arranged transverse to a direction of movement of the draper canvas with the slats having a height from the base layer which is greater than the height of the strip from the base layer, each of the slats having a front end rearward from the rear edge of the strip.

BRIEF DESCRIPTION OF THE DRAWINGS

One embodiment of the invention will now be described in conjunction with the accompanying drawings in which:

FIG. 2 is a cross sectional view along the lines 2-2 of FIG. 1 showing the front part of the header and draper canvas.

FIG. 3 is a cross sectional view along the lines 2-2 of FIG. 1 showing the rear part of the header and draper canvas and the co-operation of the rear guide bead with a groove in the roller.

FIG. 4 is a cross sectional view through one edge of the canvas only taken at location where there is no transverse slat.

FIG. 5 is a cross sectional view through one edge of the canvas only taken at a transverse slat.

In the drawings like characters of reference indicate corresponding parts in the different figures.

DETAILED DESCRIPTION

Figure 1:
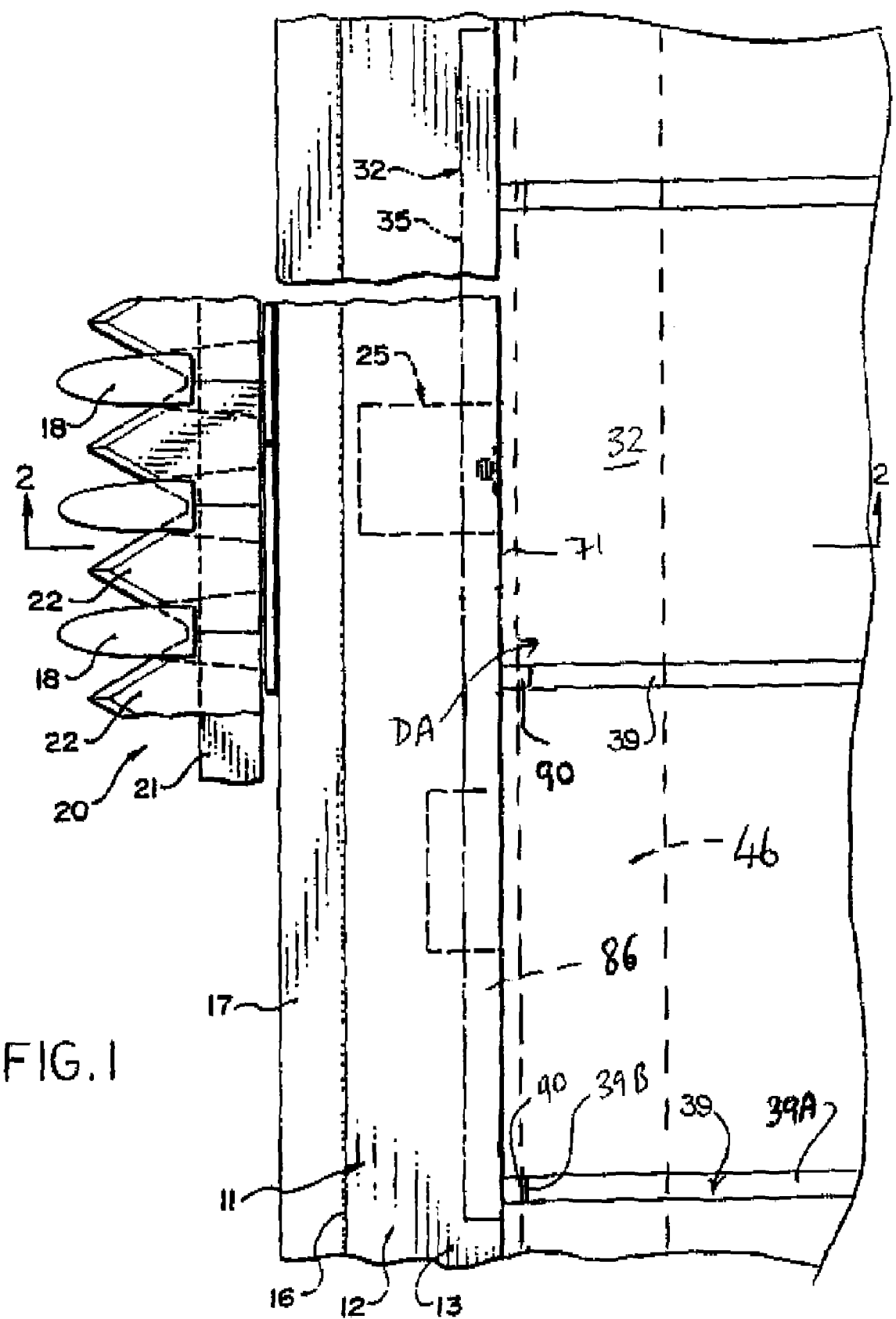
FIG. 1 is a top plan view of the front part of a header according to the present invention.

Only those parts of the header which are of importance to the present invention are shown in the above figures of the present application and the remaining parts of the header including the frame structure, drives, ground wheels and the like are omitted as these will be well known to one skilled in the art. The present invention is concerned with the area of co-operation between the front and rear edges of the draper with the cutter bar and with the rear header plate respectively and therefore these elements only are shown in detail.

Many of the figures and much of the following description is taken from the aforementioned U.S. Pat. Nos. 5,459,986 and 6,351,931 of the present assignees since these show the basic construction of the header and those drawings have been modified to include the details of the present invention as described hereinafter.

The header therefore comprises a frame, one element of which is indicated at 10 in the form of a beam extending horizontally and forwardly from a rear support frame structure (not shown) to a cutter bar assembly generally indicated at 11 for support of that cutter bar assembly. The beam 10 forms one of a plurality of such beams arranged at spaced positions along the length of the header frame so as to support the cutter bar assembly 11 as an elongate structure across the front edge of the header.

The cutter bar comprises a generally C-shaped beam 12 which provides structural support for the cutter bar with the C-shaped beam being welded to the front ends of the forwardly extending beams 10. The C-shape beam 12 includes a top plate portion 13, a bottom plate portion 14 and a forward plate portion 15 which converges from the top and bottom plate portions toward a front apex 16 forming a forward most point of the beam 12. At the apex 16 is welded a longitudinally extending bar 17 which forms a support for a plurality of knife guards 13 only some of which are shown in FIG. 1 for convenience of illustration. The knife guards are of course of well known construction and their shape is shown only schematically. The knife guards carry a sickle knife assembly 20 having a longitudinally reciprocating bar 21 driving a plurality of triangular knife blades 22 which sit on the knife guards and reciprocate back and forth across the knife guards in a cutting action. Again this construction is well known and therefore detail is not necessary.

The cutter bar support beam 12 also carries an elongate angle iron 23 which is welded onto the top plate portion 13 on the underside thereof at the front edge thereof with the angle iron extending vertically downwardly and then forming a support plate 24 extending forwardly therefrom toward the apex 16.

The draper assembly generally indicated at DA includes a first draper support roller 30 and a second draper support roller (not shown). One of these rollers is driven by a drive motor (not shown) to effect rotation of the draper in conventional manner. The draper assembly further includes a draper canvas 32 in the form of a continuous loop or band of fabric which is wrapped around the rollers at respective ends to form an upper run 33 of the draper canvas on top of the rollers and a lower run 34 of the canvas underneath the rollers. The rollers are thus spaced longitudinally of the cutter bar and arranged with their axes of rotation parallel and at right angles to the cutter bar. The draper canvas thus includes a front edge 35 of the upper run which is adjacent the cutter bar and a rear edge 36 of the upper run 33 which is remote from the cutter bar and spaced rearwardly therefrom thus defining therebetween a flat surface of the upper run for transportation of the crop longitudinally of the header. The lower run 34 also includes a front edge 37 and a rear edge. The draper canvas includes a plurality of conventional transverse slats 39 which assist in carrying the crop along the draper canvas. Each edge of the draper canvas can include a conventional folded seam so as to define a portion of the canvas material which is folded back as indicated at 40 with that folded back portion being folded back on top of the fabric layer and bonded to the canvas by the vulcanization effect in the manufacture of the canvas.

The upper run of the draper canvas is supported by a support plate assembly 45 which includes a front plate and includes a center plate and rear plates which are not shown for convenience of illustration. The front plate includes a horizontal top plate portion 46, shown in phantom in FIG. 1, lying underneath the upper run of the draper canvas adjacent the front edge for supporting that front edge in sliding movement across the top surface of that plate. The support plate 46 further includes a vertical plate portion, which extends downwardly from a front edge of the top plate portion (not shown in the figures). At a bottom edge of the vertical plate portion is provided a lower horizontal plate portion thus forming the front support plate into a generally C-shape to provide structural strength so that the support plate is essentially self supporting mounted on mounting brackets (also not shown).

The rollers 30 are carried on the support plate 46. Further details of the brackets and support elements are described in the above patent of Talbot.

The length of the bracket 25 is arranged so that the front edge 49 of the support plate is spaced rearwardly from the front edge 35 of the upper run of the draper canvas. In addition the front end of the rollers 30 is spaced rearwardly from the front edge 35 of the upper run of the canvas. This recessing of the front edges of the support plate member and of the rollers provides a portion 70 of the front edge of the draper canvas which is cantilevered outwardly beyond the support provided by those elements.

The beam 12 of the cutter bar is shaped so that the top plate portion 13 extends rearwardly to a rear edge 71 which overlaps the portion 70. The rear edge 71 is located therefore at a position rearwardly of the front edge 35 of the draper canvas and in a position forwardly of the front edge 49 of the support plate and the front ends 65 of the draper rollers. That portion of the draper canvas therefore which engages the underside 72 of the top plate portion 13 is unsupported on its underside and is therefore free to flex downwardly should it be depressed downwardly by the presence of material collecting on the under surface 72. The top plate portion 13 of the beam 12 is substantially horizontal that is parallel to the generally horizontal surface of the upper run. The cooperation therefore between the surface 72 of the upper plate portion 13 and the upper surface of the draper canvas at the portion 70 provides a seal which inhibits the tendency of materials to pass between the draper canvas and the cutter bar. This seal therefore inhibits the build-up of materials inside the C-shape of the cutter bar and between the draper canvas upper run and lower run and around the draper rollers which can of course cause damage.

At the rear edge 36, the draper canvas is guided on the draper roller by a V groove 30A in the roller 30 into which projects from the back of the canvas a V-shaped guide rib 75 which runs along the inner surface of the canvas along its full length.

The construction of the draper of the present invention as shown in FIGS. 4 and 5. Thus the draper of the present invention is symmetrical in that the draper can be reversed by rotating the draper so that the front edge is turned to become the rear edge and vice versa. Thus only the front edge is shown in FIGS. 1, 4 and 5 with it being understood that the rear edge is exactly symmetrical. Thus in FIG. 4 is shown a portion of the draper canvas which includes a base layer or sheet 80 which is formed of a fabric sheet 81 which is folded at its edge 82 to form a portion 83 which is folded back on top of the layer 81 to form an end edge 84 of the folded back portion 83 which lies on top of the fabric of the layer 81 spaced away from the edge 82. The canvas carries a coating or infused rubberized layer in a conventional manner. At the edge 82 is provided a strip 86 of a resilient material. The resilient material is preferably of the same construction as the rubberized coating so that it can be vulcanized with the structure of the canvas and molded in place as part of the manufacturing process. The strip 86 has a front edge 87 which is at or immediately adjacent the edge 82 of the base layer of the canvas. In the embodiment shown the front edge 87 of the strip is immediately coincident with the edge 82. The strip includes a rear edge 88 spaced away from the edge 87 into the body of the canvas. The strip has an upper surface 89 which is flat and smooth. Thus the strip is rectangular with the side edges 87 and 88 being vertical and the top surface 89 horizontal. However the strip may be shaped with inclined or tapered side edges 87 and 88.

In the example shown the strip has the width of the order of 1" (25 mm) and a height of the order of 1/8" (4.0 mm). The strip thus stands up from the upper surface of the base layer of the draper canvas that is the upper surface of the folded back portion 83.

On the underside of the draper canvas is molded the bead 75 which is generally V shaped so that the sides are tapered downwardly and inwardly to a bottom surface 75A which is narrower than the base of the bead. The bead is located at a position spaced from the edge 82 but underlying the strip 86 so that the edge of the bead is spaced from the edge 82 by a distance less than the edge 88 of the strip.

As shown in FIG. 5 the canvas also carries slats 39 which stand upwardly from the upper surface of the canvas to a top edge 39A which is at a height significantly greater than the height of the strip 86. Each slat extends transversely across the draper canvas to a position closely adjacent the strip at the respective side edges of the canvas. Thus each slat extends to an end edge 39B which is spaced from the side edge 82 by a distance greater than the spacing of the edge 88 of the strip so that the edge 39B of the slat is spaced from the edge 88 of the strip. The slats 39 are molded integrally with the strip 86 by providing portions 90 which extend from the edge 39B of the slat to the edge 88 of the strip 86. These portions as best shown in FIG. 1 have a width equal to the width of the slat 39 to which they are attached and a height (as shown in FIG. 5) equal to the height of the strip 86. These portions thus act to integrate the structure so that the slats connect into the strip to reduce the tendency of the slats to tear away from the canvas since the same resilient material forming the strip extends into the slat and thus is resistant to stripping or tearing from the base layer of the draper canvas. In the example shown, the bead 75 has a width at its base of the order of 1/2" (13 mm) and a height from the under-surface of the canvas of the order 1/3" (8 mm). The center of the bead is spaced from the edge 82 by a distance of the order of 2/3" (16 mm). This suitably locates the bead at a position on the canvas for cooperation with the groove in the roller at the rear of the canvas as best shown in FIG. 3.

Turning now to FIG. 2, it will be noted that the side edge 88 of the strip is substantially coincident with the end edge 71 of the plate 13 so that the whole of the strip 86 underlies the plate 13. The presence of the strip 86 provides an improved sealing effect between the surface 89 of the strip and the surface 72 of the plate 13 due to an increase in pressure therebetween. In addition the presence of the shoulder or edge 88 provides a raised surface standing upwardly from surface of the canvas to inhibit the penetration of material into the space between the surfaces 89 and 72. The surface 89 is formed as a flat surface molded onto the top of the resilient strip so that the surface 89 can be formed if required. Also it is or can be smoother than the surface of the canvas itself to provide an improved contact surface engaging the surface 72.

It will be noted in FIG. 2 that the bead 75 at the front edge is located at a position spaced forwardly of the edge 49 of the support plate and forwardly of the end of the roller. Thus the bead 75 at the front edge of the canvas has no effect since it is engaging no component of the roller or support plate. However it will be noted that the bead 75 at the rear edge is located in engagement with a groove in the roller. In this way wear of the structure takes place at the strip 86 at the front edge and the bead 75 at the rear edge. These two components are worn in use so that the strip 86 at the rear edge and the bead 75 at the front edge remain unworn. Rotation of the canvas when the wear has become excessive allows therefore the canvas to continue in use while the strip 86 from the rear edge is moved for the sealing effect at the front edge and the bead 75 is moved to the rear edge for providing guiding action.

The arrangement disclosed herein therefore provides an effective guiding action which is improved relative to the above patent of Shearer. The sealing action provided by the additional resilient strip 86 significantly enhances the sealing effect relative to the above arrangement of Talbot.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is

1. A header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that out crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

the draper assembly including a draper canvas forming a continuous loop of flexible material wrapped around the rollers so as to define an upper run of the draper canvas on top of the rollers and a lower run of the draper canvas below the rollers and so as to define an outer surface of the draper canvas which faces outwardly of the loop that the outer surface forms the upper surface of the upper run and the lower surface of the lower run and an opposed inner surface of the draper canvas which faces inwardly of the loop;

a front edge of the upper run of the draper canvas being arranged underneath the cutter bar, and a rear edge of the upper run of the draper canvas being spaced rearwardly of the cutter bar;

a front draper support plate defining a substantially horizontal support surface lying under the upper run adjacent the front edge thereof and extending therealong between the first and second guide rollers;

the first and second guide rollers each having a front end thereof recessed rearwardly of the front edge of the upper run of the draper canvas and the support plate having a front edge thereof recessed rearwardly of the front edge of the upper run of the draper canvas such that the upper run of the draper canvas includes a portion thereof at the front edge which is cantilevered forwardly of the rollers and of the support plate;

the draper canvas including a base layer of a sheet material having a front edge of the base layer defining the front edge of the draper canvas and a rear edge of the base layer defining a rear edge of the draper canvas;

the draper canvas including an additional strip of a resilient material attached on to the outer surface of the base layer at or adjacent the front edge of the base layer so as to stand outwardly from the outer surface of the base layer and extending rearwardly from the front edge of the base layer to a rear edge of the additional strip spaced rearwardly of the front edge of the base layer and forwardly of the rear edge of the base layer;

the additional strip standing outwardly of the outer surface from the base layer to define an outer surface of the additional strip raised from the base layer;

the cutter bar including an element thereof extending rearwardly over the upper run of the draper canvas to a position rearwardly of the front edge of the upper run of the draper canvas and forwardly of the front end of the rollers and of the front edge of the support plate and engaging the outer surface of said additional strip on the draper canvas so that the engagement between the element of the cutter bar and the outer surface of the additional strip forms a seal to inhibit entry between the cutter bar and the draper canvas of materials carried by the cut crop.

2. The header according to claim 1 wherein the additional strip is of substantially constant thickness such that the outer surface is substantially flat.

3. The header according to claim 1 wherein the front edge of the additional strip is located immediately at the front edge of the base layer.

4. The header according to claim 1 wherein the rear edge of the additional strip is substantially coincident with the rear edge of the element.

5. The header according to claim 1 wherein the rear edge of the additional strip is in front of the front edge of the support plate.

6. The header according to claim 1 wherein the strip is shaped such that the additional strip has a width from the front edge to the rear edge of the additional strip which is greater than the height of the additional strip from the outer surface of the base layer.

7. The header according to claim 6 wherein the additional strip has a width of the order of 25 mm and a height of the order of 4 mm.

8. The header according to claim 6 wherein draper canvas is formed of a layer of fabric material with a resilient coating on the layer of the fabric material.

9. The header according to claim 8 wherein the draper canvas has a folded edge of the base layer at the front and rear edge of the base layer.

10. The header according to claim 9 wherein the folded edge of the base layer is folded back on the outer surface of the fabric material.

11. The header according to claim 1 wherein the draper canvas includes a second additional strip on the rear edge located and arranged symmetrically relative to the additional strip on the front edge.

12. The header according to claim 11 wherein the draper canvas has a first bead of a resilient material attached on the inner surface adjacent the front edge and a second bead of a resilient material additional on the inner surface adjacent the rear edge with the second bead located and arranged symmetrically relative to the first bead.

13. The header according to claim 12 wherein each of the first and second beads is arranged so as to lie on the inner surface opposite to the respective additional strip within the width of the respective additional strip.

14. The header according to claim 1 wherein the draper canvas has a plurality of slats arranged transverse to a direction of movement of the draper canvas with the slats having a height from the base layer which is greater than the height of the strip from the base layer, each of the slats having a front end spaced rearwardly from the rear edge of the additional strip.

15. The header according to claim 14 wherein there is provided a plurality of pieces of resilient material each connecting a forward end of a respective one of the slats on the outer surface to the additional strip with the pieces having a height from the base layer which is substantially equal to the height of the additional strip from the base layer.

16. The header according to claim 14 wherein the draper canvas includes a second additional strip on the rear edge located and arranged symmetrically relative to the additional strip on the front edge with the second additional strip having a front edge at or adjacent the rear edge of the draper canvas and a rear edge spaced from the rear edge of the draper canvas and wherein the draper canvas has a first bead of a resilient material attached on the inner surface adjacent the front edge of the draper canvas and a second bead of a resilient material adjacent the rear edge of the draper canvas located and arranged symmetrically relative to the first bead with the slats extending between the additional strip and the second additional strip.

17. A draper canvas for use with a draper assembly of a header for cutting and transporting a standing crop where the draper assembly includes a first and a second draper guide roller and where the draper canvas is arranged for forming a continuous loop of flexible material wrapped around the rollers so as to define an upper run of the draper canvas on top of the rollers and a lower run of the draper canvas below the rollers and so as to define an outer surface of the draper canvas which faces outwardly if the loop that the outer surface forms the upper surface of the upper run and the lower surface of the lower run and an opposed inner surface of the draper canvas which faces inwardly of the loop;

the draper canvas comprising:

a base layer of a sheet material having a front edge of the base layer defining the front edge of the draper canvas and a rear edge of the base layer defining a rear edge of the draper canvas;

an additional strip of a resilient material attached on to the outer surface of the base layer at or adjacent the front edge of the base layer so as to stand outwardly from the outer surface of the base layer and extending rearwardly from the front edge of the base layer to a rear edge of the additional strip spaced rearwardly of the front edge of the base layer and forwardly of the rear edge of the base layer;

the additional strip standing outwardly of the outer surface from the base layer to define an outer surface of the additional strip raised from the base layer;

the additional strip being shaped such that the strip has a width from the front edge of the base layer to the rear edge of the additional strip which is greater than the height of the additional strip from the outer surface of the base layer;

and a plurality of slats attached onto the outer surface of the base layer and arranged transverse to a direction of movement of the draper canvas with the slats having a height from the outer surface of the base layer which is greater than the height of the additional strip from the outer surface of the base layer, each of the slats having a front end rearward from the rear edge of the additional strip.

18. The draper canvas according to claim 17 wherein the additional strip is of substantially constant thickness such that the upper surface is substantially flat.

19. The draper canvas according to claim 17 wherein the front edge of the additional strip is located at the front edge of the canvas.

20. The draper canvas according to claim 17 wherein the additional strip has a width of the order of 25 mm and a height of the order of 4 mm.

21. The draper canvas according to claim 17 having a folded edge of the base layer at the front and rear edge of the base layer.

22. The draper canvas according to claim 21 wherein the folded edge of the base layer is folded back on the outer surface of the base layer.

23. The header according to claim 17 including a second additional strip on the rear edge located and arranged symmetrically relative to the additional strip on the front edge with the second additional strip having a front edge at or adjacent the rear edge of the draper canvas and a rear edge spaced from the rear edge of the draper canvas and wherein the draper canvas has a first bead of a resilient material attached on the inner surface adjacent the front edge of the draper canvas and a second bead of a resilient material attached on the inner surface adjacent the rear edge of the draper canvas with the second bead located and arranged symmetrically relative to the first bead.

24. The draper canvas according to claim 23 wherein each of the beads is arranged so as to lie on the inner surface opposite to the respective additional strip within the width of the respective additional strip.

25. The draper canvas according to claim 17 wherein there is provided a plurality of pieces of resilient material each connecting a forward end of a respective one of the slats on the outer surface to the additional strip on the outer surface with the pieces having a height from the base layer which is substantially equal to the height of the strip from the base layer

\* \* \* \* \*